May 21, 1963    J. K. PAPPAS    3,090,128
GEAR CHECKING FIXTURE
Filed July 1, 1959    2 Sheets-Sheet 1
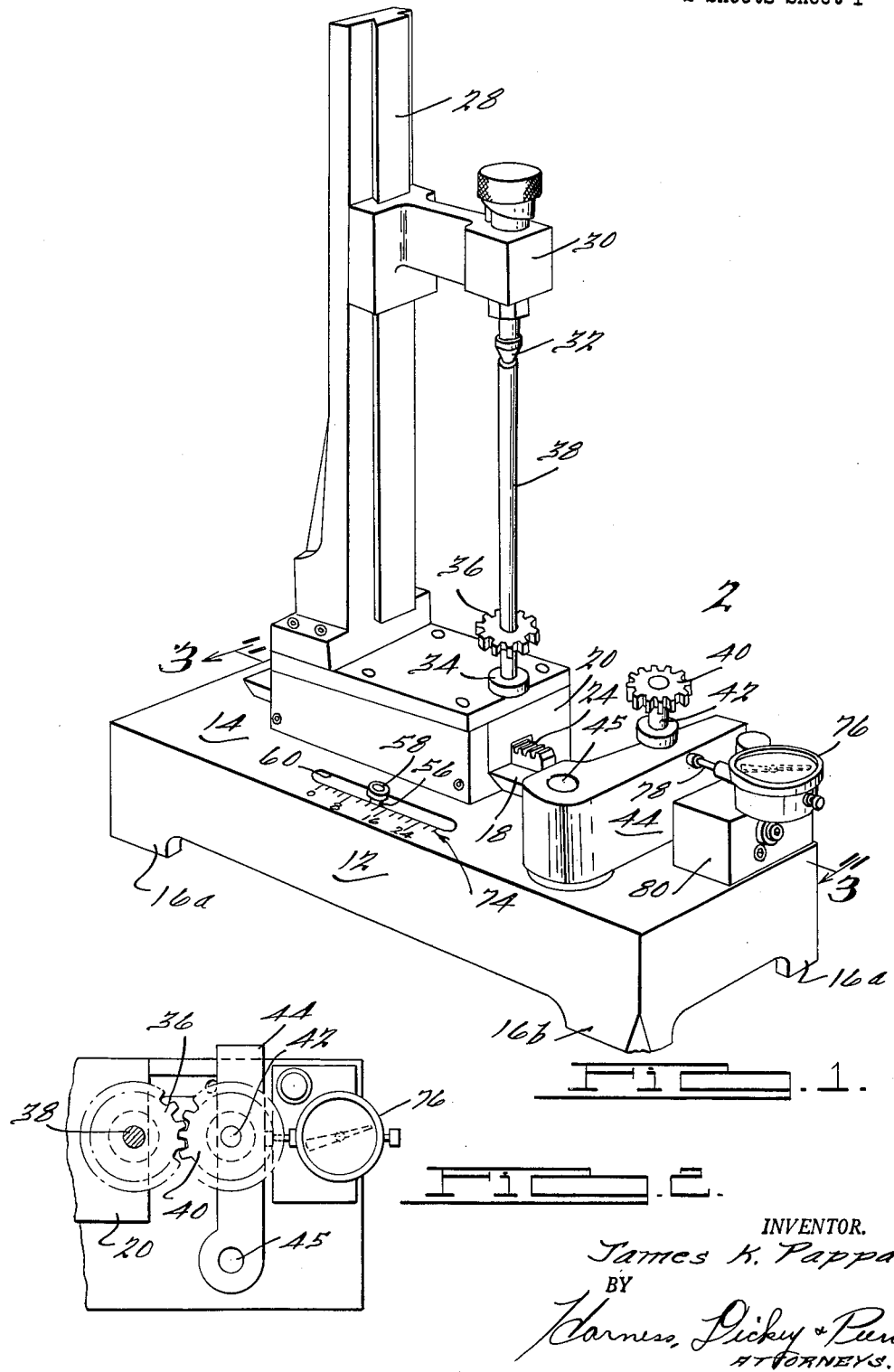
INVENTOR.
James K. Pappas.
BY
Harness, Dickey & Pierce.
ATTORNEYS.

May 21, 1963 J. K. PAPPAS 3,090,128
GEAR CHECKING FIXTURE
Filed July 1, 1959 2 Sheets-Sheet 2

INVENTOR.
James K. Pappas.
BY
Harness, Dickey & Pierce,
ATTORNEYS.

United States Patent Office 3,090,128
Patented May 21, 1963

3,090,128
GEAR CHECKING FIXTURE
James K. Pappas, 28274 Thornybrae, Farmington Township, Oakland County, Mich.
Filed July 1, 1959, Ser. No. 824,384
3 Claims. (Cl. 33—179.5)

The present invention relates to gear checking fixtures and particularly to fixtures for use in the inspection of production gears wherein the gear to be tested is rolled or turned while in mesh with a master inspection gear.

The checking fixture of the present invention is adapted to inspect gears for either "total composite error" or "tooth-to-tooth composite error," which includes the effect of spacing and profile errors, lateral run-out or wobble and eccentricity. Each of such errors is reflected in the displacement of either the production gear or the master gear as such gears are rolled against one another with one on a fixed support and the other on a yieldable support. The amount of such displacement is indicated by means of a dial indicator having a plunger engageable with the support for the displaceable gear. While such differences in reading as might be occasioned by changes in the pressure with which the production gear is rolled against the master gear might be considered of little consequence in the checking of certain gears intended for power transmission purposes, such differences are important in gears intended for the transmission of informational data. In computing systems and other precise mechanisms in which the informational content of shaft rotation is to be transmitted through gear rotation, the tolerances demanded of gears can far exceed those required in gears intended for power transmission purposes and the pressure with which the gears are rolled together has a definite effect upon the reading obtained. Based upon this fact, the American Gear Manufacturers Association has established standard pressures under which gears of varying diametral pitch are to be checked. Heretofore, several types of gear checking fixtures have ben proposed in which the pressure between the production gear and the master gear is adjusted by various spring devices. The exact pressure obtained by adjusting the tension on springs can vary by substantial amounts and such devices are relatively inaccurate. It is, therefore, an object of the present invention to provide a gear checking fixture having precise means by which the pressure with which the production gear is rolled against the master gear may be accurately controlled.

It is another object of the present invention to provide a gear checking fixture of the above character which is relatively inexpensive of manufacture and which has an adjustable pressure applying mechanism, may be accurately and permanently calibrated at the time of its manufacture and which is not subject to becoming out of adjustment through usage or the passage of time.

It is another object of the present invention to provide a gear checking fixture of the above character which is extremely sturdy in construction and in which the working pressures may be rapidly and conveniently adjusted.

These and other objects of the present invention will become apparent from the following detailed description taken in conjunction with the accompanying drawings wherein:

FIGURE 1 is a perspective view of a gear checking fixture embodying the principles of the present invention;

FIG. 2 is a plan view of a portion of the structure illustrated in FIG. 1 looking in the direction of the arrow 2 thereof;

Figure 3:
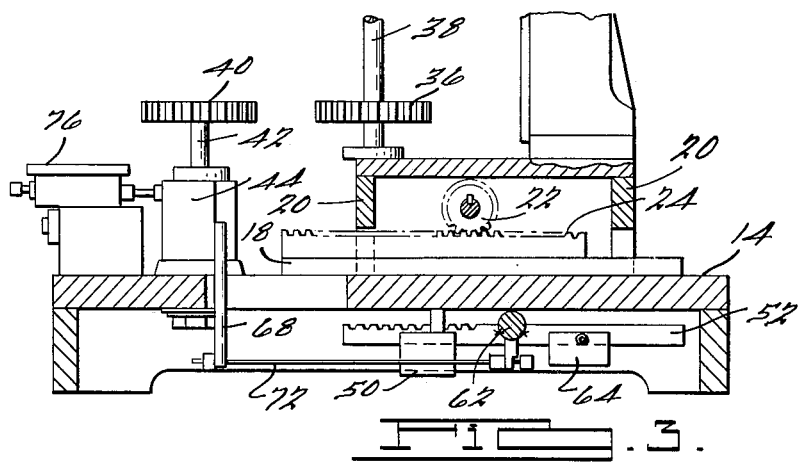
FIG. 3 is a sectional view, with parts broken away, of the structure illustrated in FIG. 1 taken along the line 3—3 thereof.

Referring now to the drawings, the fixture includes a base 12 having an upper flat supporting wall 14 and four legs 16a, 16b, 16c and 16d to maintain the supporting wall 14 spaced above the surface on which the fixture is resting. Resting on the wall 14 is a guideway 18 on which a carriage block 20 is slidable. The block 20 rotatably carries a pinion 22 engageable with a rack 24 mounted on the top of the guideway 18 and which may be rotated by means of a hand knob 26 to adjust the carriage block 20 along the guideway 18. A vertical column 28 extends upwardly from the carriage block 20 and serves to support a head stock 30 which is adjustable along the length thereof and carries a top center 32 disposed vertically above a bore-defining arbor support 34 on the carriage block 20. By this means, a workpiece, in the form of a production gear 36, carried on an arbor 38, may be rotatably supported between the support 34 and the top center 32 for rotation about a vertical axis.

The production gear 36 is adapted to mesh with a master gear 40 rotatably carried on an arbor 42 having a vertical axis. The arbor 42 is mounted adjacent the free end of a pivot arm 44 which is pivotally supported on a pivot pin 45 journaled in a precision bearing unit 46 mounted in the supporting wall 14. The axis of the pivot pin 42 is vertical and thus parallel to the axes of the arbors 38 and 42. The pivot pin 42 is held in place by means of a nut 48.

Figure 4:
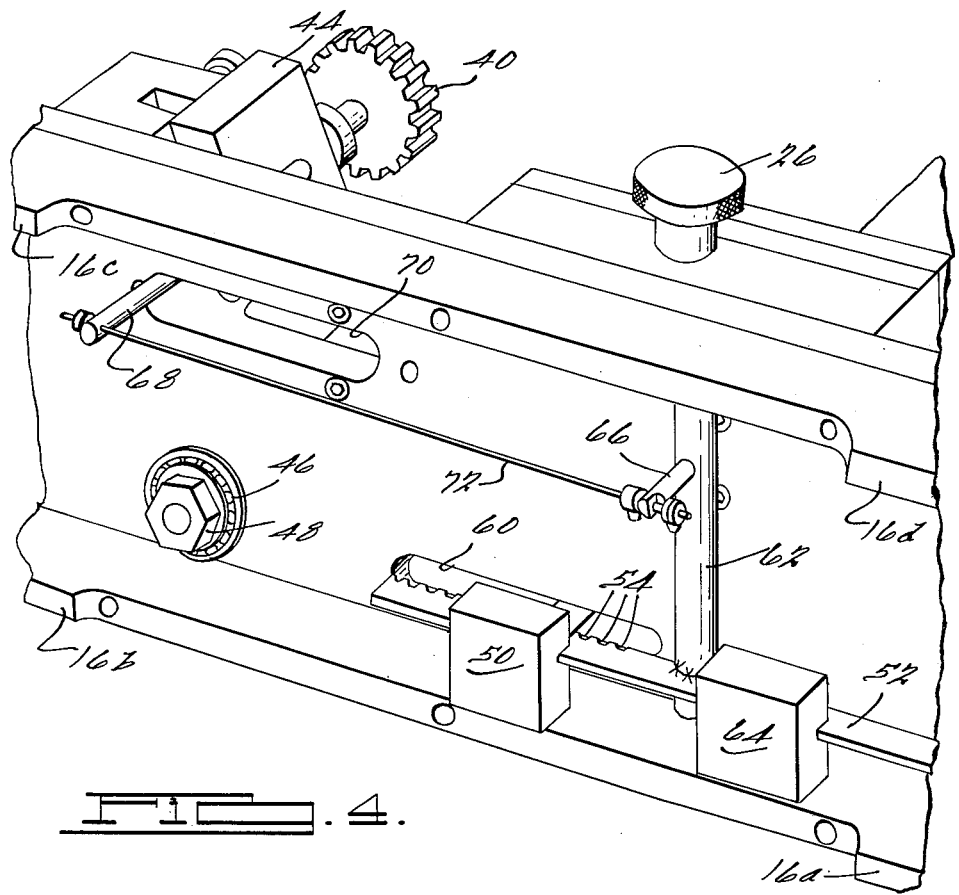
FIG. 4 is a perspective view of the structure illustrated in FIG. 1 taken from the underside thereof.

The pivot arm 44 is normally urged in a direction toward the production gear 36 by means of an adjustable weight 50 which is best seen in FIG. 4. The weight 50 is suspended from one side of a tiltable lever 52 having a plurality of notches 54. The block 50 has an integral hanger arm 56 provided with a knob 58. The hanger arm 56 may be fitted in any selected one of the notches 54 to obtain varying degrees of pressure between the gears and it also extends upwardly through an elongated slot 60 formed in the wall 14 to present its knob 58 to the upper surface thereof for convenient handling by an operator. The lever 52 is fixed to a pivotable bar 62 adjacent its middle and the opposite side thereof carries a fixed counter weight 64. A depending arm 66 is formed integrally with the bar 62, while a depending arm 68 is fixed to the free end of the pivot arm 44 and extends through a slot 70 formed in the wall 14. A wire 72 interconnects the lower ends of the arms 66 and 68 to transmit the torque on the bar 62 created by the weight 50 into a yieldable force acting on the pivot arm 44. It should be noted that the arm 68 is spaced an equal distance from the pivot pin 42 as the arbor 42 and thus the force applied to the arm 68 is the same as that applied to the master gear 40.

While the lever 52 may be provided with any desired number of notches to permit an infinite number of pressure variations, the location of such notches and the weight which they represent may be indicated by indicia 74 inscribed on the upper surface of the wall 14 adjacent the slot 60. Thus, to alter the working pressure between the gears, it is only necessary for an operator to grasp the handle 58 projecting upwardly through the slot 60 and shift the weight 50 from one notch to another, the correct notch being indicated by the alignment of the knob 58 with the desired one of the indicia 74.

In performing a checking operation, after the gears 40 and 36 have been installed on the fixture, the carriage block knob 26 is rotated to advance the carriage block 20 toward the master gear 40 until the production gear 36 is in working engagement or mesh therewith and the pivot arm 44 is approximately in a centered position in which it is free to rock or pivot in either direction. The production gear 36 is then manually rotated to produce rotation of the master gear. Any errors or imperfections in the production gear are reflected by a slight pivotal or oscillatory movement of the pivot arm 44. The magnitude of this movement is detected by means of a dial indicator 76 having a spring-biased plunger 78 engaging the pivot arm 44. The indicator may be supported by any suitable means, such as a bracket or block 80 shown resting on the wall 14. The existence of errors relating to individual tooth profile is reflected by the rapid fluctuation of the dial of the indicator 76 as the gears are moved from one tooth to another. The absence of concentricity of the gear is generally reflected by a more gradual movement of the center or norm of the individual fluctuations for each tooth. However, the interpretation of the dial movements is a well known art and forms no part of the present invention.

From the foregoing, it will be seen that the parts of the checking fixture which are manipulated in the operation thereof are located on top of the base 12, while the lever 52, bar 62 and the structure associated therewith is disposed beneath the wall 14 of the base 12. In addition, four side walls 78 integrally formed with the base 12 connect the legs 16a, 16b, 16c and 16d and serve not only to hide the structure beneath the wall 14 from view, but also contribute to the structural strength of the base 12. The slot 60 permits access to the weight 50 from the upper surface of the base 12 without substantially weakening the base or exposing the mechanism located on the underside of the base. Thus, by means of the present invention, the weight 50 may be rapidly and conveniently shifted from one notch 54 to another in order to produce varying pressures of gear engagement. The amount of pressure established may be easily read by the position of the knob 58 of the weight 50 with respect to the indicia 74 inscribed on the upper surface of the wall 14.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A gear checking fixture including a base, a first gear supporting means on said base for supporting a gear for rotation about a fixed axis, a pivot arm on said base pivotable about a vertical axis, a second gear supporting means on said pivot arm for rotatably supporting a gear in mesh with the gear carried by said first gear supporting means, a pivotable bar supported by said base beneath said first gear supporting means for pivotal movement about a horizontal axis, a lever fixed to said bar, a weight adjustably positionable on said lever, an arm extending from said bar, an arm depending from said pivot arm, and elongated means interconnecting said arms whereby said pivot arm will be pulled toward said first means with a predetermined force in accordance with the position of said weight on said lever.

2. The structure set forth in claim 1 in which said base is provided with an elongated opening disposed above said lever and said weight is provided with a handle extending upwardly through said opening for the manual adjustment of said weight on said lever from a position above said base.

3. The structure set forth in claim 2 in which said base is provided with indicia adjacent said slot to indicate the position of said weight on said lever.

References Cited in the file of this patent

UNITED STATES PATENTS

| | | |
|---|---|---|
| 1,222,392 | Green | Apr. 10, 1917 |
| 1,394,324 | Matthews | Oct. 18, 1921 |
| 2,444,016 | Bennett | June 22, 1948 |
| 2,540,961 | Osplack | Feb. 6, 1951 |
| 2,661,542 | Bean | Dec. 8, 1953 |
| 2,726,455 | Saari | Dec. 3, 1955 |
| 2,731,728 | Turner | Jan. 24, 1956 |
| 2,741,034 | Donaghey | Apr. 10, 1956 |
| 2,767,479 | Sittler | Oct. 23, 1956 |